Jan. 15, 1952     J. F. SCHNEIDER, JR     2,582,461
APPARATUS FOR POSITIONING AND BROACHING BUTTONS
Filed Oct. 12, 1948     2 SHEETS—SHEET 1
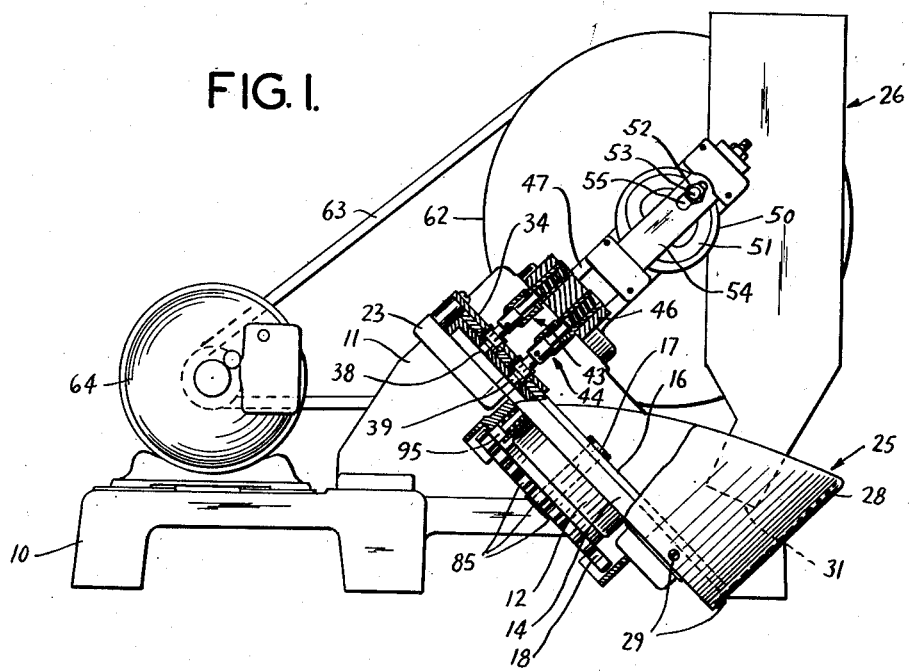
FIG. I.
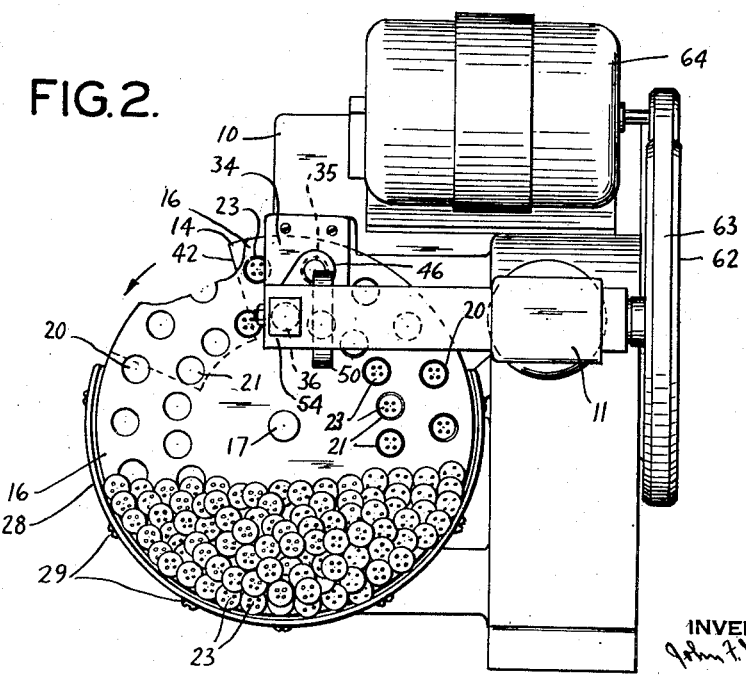
FIG. 2.
INVENTOR
John F. Schneider, Jr.
BY Emery Varney,
Whittemore & Dix
ATTORNEY Jan. 15, 1952     J. F. SCHNEIDER, JR     2,582,461
APPARATUS FOR POSITIONING AND BROACHING BUTTONS
Filed Oct. 12, 1948     2 SHEETS—SHEET 2
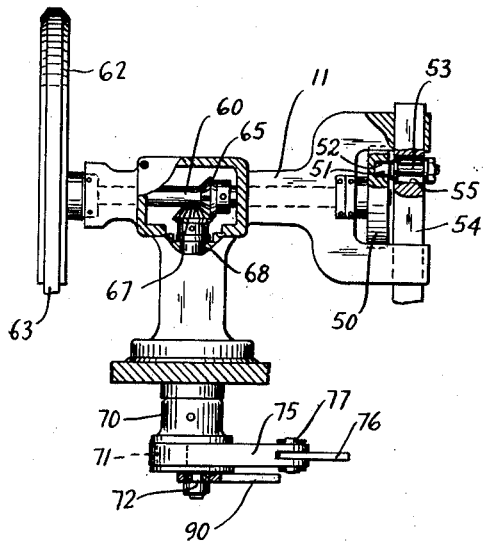
FIG.3.
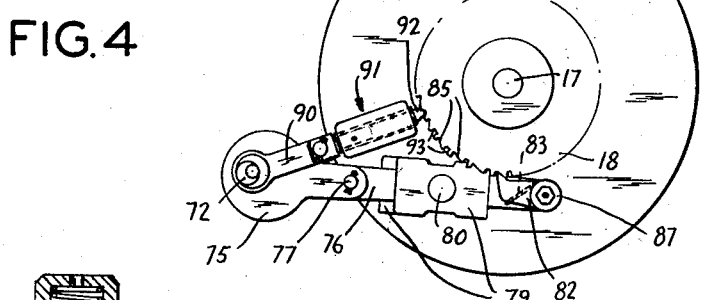
FIG.4
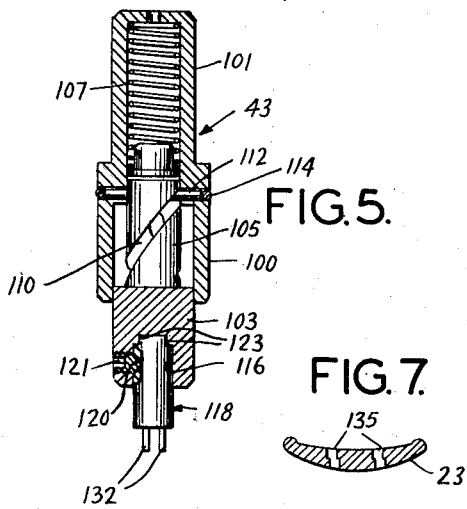
FIG.5.
FIG.7.
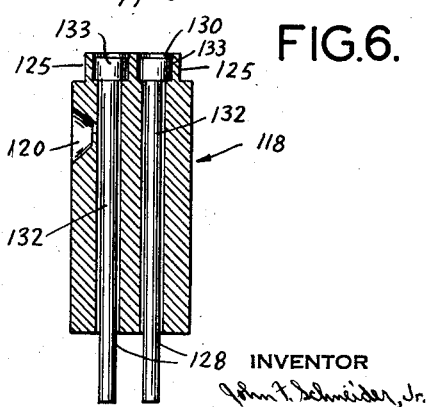
FIG.6.
INVENTOR
John F. Schneider, Jr.
BY Emery Varney,
Whittemore & Dix
ATTORNEY Patented Jan. 15, 1952

2,582,461

UNITED STATES PATENT OFFICE 2,582,461

APPARATUS FOR POSITIONING AND BROACHING BUTTONS

John F. Schneider, Jr., Ridgewood, N. Y., assignor to Buttondex Corporation, New York, N. Y., a corporation of New York Application October 12, 1948, Serial No. 54,093

11 Claims. (Cl. 79—1)

1

This invention relates to improved apparatus for operating on buttons. The machine includes mechanism for locating buttons with their holes correctly aligned as is necessary for sewing machines; and the invention includes also improved mechanism for broaching buttons.

One object of the invention is to provide an improved machine for broaching buttons at higher rates of production than has been possible with machines of the prior art, and for performing the broaching operations with less frequent breakage of buttons, and less breakage of the broaching pins used in the machine.

One feature of the invention relates to apparatus by which buttons dumped in a hopper are automatically taken from the hopper and presented successively at a broaching station. Another feature relates to apparatus for indexing successive buttons under a broaching head and for operating the indexing apparatus and the broaching head in timed relation with one another.

Another object of the invention is to provide a button engaging device that can be used as either a broaching head or as a positioning mechanism for turning buttons to bring their holes into correct alignment with respect to sewing machine needles. In its broader aspects, the button engaging device is applicable to any use in which it is desirable to punch or clear the holes of composition or plastic buttons, or to turn successive buttons or equivalent elements into positions in which the holes are disposed in the same positions.

Other objects, features and advantages of the invention will appear or be pointed out as the description proceeds.

In the drawing, forming a part hereof, in which like reference characters indicate corresponding parts in all the views:

Figure 1 is a side elevation, with parts broken away and in section, showing a button broaching machine embodying this invention.

Figure 2 is a top plan view of the machine shown in Figure 1, with the upper portion of the hopper removed.

Figure 3 is a fragmentary detail view, partly in section, of the driving mechanism for the machine.

Figure 4 is a bottom view of the conveyor operating and indexing mechanism.

Figure 5 is a greatly enlarged, sectional view of one of the broaching heads shown in Figure 1.

Figure 6 is a greatly enlarged sectional view of the pin holder shown in Figure 5.

2

Figure 7 is a sectional view of an imperfectly molded button with which the machine can be used.

The button broaching machine includes a base 10 and a frame 11 extending upward from the base. There is an extension 12 at one side of the frame 11, and a stationary plate 14 attached to this extension 12 is disposed at a substantial slope.

Immediately above the stationary plate 14 there is a conveyor comprising a disc 16 attached to a shaft 17 which rotates about an axis extending through the center of the conveyor disc 16. The shaft 17 rotates in a bearing in the frame extension 12. There is an indexing disc 18 rigidly connected to the lower end of the shaft 17 for rotation as a unit with the disc 16.

There are two rows of sockets or holes 20 and 21 (Figure 2) in the conveyor disc 16. The holes 20 are at equal angular spacing around the circle along which they are located. The holes 21 are also spaced at equal angles around the smaller circle on which they are located, and there are just as many holes 21 as there are holes 20. All of the holes are of the same size and have a diameter which is only slightly greater than the diameter of the buttons with which the conveyor disc is intended to be used. When the machine is to be used for buttons of a different size, the disc 16 is replaced with another conveyor disc having openings of a size to accommodate the other buttons.

The holes 20 and 21 preferably extend entirely through the disc 16 so that buttons 23 in the holes 20 and 21 rest on the stationary plate 14 beneath the conveyor disc. The buttons 23 are supplied to the openings 20 and 21 from a hopper which preferably comprises a lower portion 25 surrounding a substantial part of the conveyor disc 16 and an upper portion 26 that keeps the buttons in the lower portion of the hopper at a fairly constant level.

The lower portion 25 of the hopper comprises a wall 28 secured at its lower ends to the stationary plate 14 by fastening means, such as screws 29. The wall 28 extends around an arc of somewhat more than 180° in the machine illustrated, but a wall of less extent can be used if properly correlated with the discharge end of the upper portion of the hopper. The wall 28 is spaced from the periphery of the conveyor disc 16 by a distance less than the thickness of the buttons 23 so that any buttons which are turned on edge in the hopper can not drop down or wedge between the stationary wall 28 and the intermittently rotating conveyor disc 16.

The upper portion 26 of the hopper has an open-top into which buttons are poured, and has a chute at its lower end with a discharge outlet 31 located at a level below the top of the wall 28. Buttons from the upper portion 26 of the hopper spread out in the lower portion 25 to a level substantially equal to the level of the discharge outlet 31, and this level remains substantially constant regardless of the number of buttons in the upper portion 26. The upper portion of the hopper is preferably supported from the frame 11, but can be supported from any other structure that occupies a fixed position with reference to the machine when the machine is in operation.

The portion of the conveyor disc 16 near the upper end of its slope passes a broaching station which includes a plate 34 with openings 35 and 36 in position to align simultaneously with the openings 20 and 21, respectively, of the conveyor disc 16. The openings 35 and 36 provide access for the broaching heads to the buttons, but these openings 35 and 36 are slightly smaller than the buttons so that the plate 34 will hold the buttons down and strip from the broaching heads any buttons that cling to the tools of the broaching heads as they move away from the conveyor disc 16.

There are other openings 38 and 39 (Figure 1), in the stationary plate 14, immediately below the openings 35 and 36, respectively. These openings 38 and 39 are of smaller diameter than the openings of the conveyor disc in which the buttons are carried. The purpose of the openings 38 and 39 is to provide for the discharge of any flash or other material that is punched out of the holes in the buttons, but it is important to have these openings 38 and 39 smaller than the buttons so as to support the buttons during a broaching operation. Just beyond the broaching station there is a cut out 42 (Figure 2) in the stationary plate 14 so that the buttons which have been broached will drop out of the conveyor disc openings in which they are carried. A basket or other receptacle is placed under the cut out 42 for receiving the buttons as they drop from the machine.

There are two broaching heads 43 and 44 (Figure 1) carried by a punch head 46 which reciprocates in a guide 47 on the frame 11. The broaching head 43 is in line with the opening 38 and the broaching head 44 is in line with the opening 39, at the broaching station.

Reciprocating movement is imparted to the punch head 46 by a cam 50 that has a cam groove 51 into which a cam follower 52 (Figure 3) extends. This cam follower 52 rotates about a stud 53 rigidly connected with a pitman 54 that moves the punch head. The stud 53 is adjustable with respect to the pitman 54 along a slot 55 to change the positions at which the punch head stops at each end of its stroke. This adjustment of the stud 53 is maintained in a set position by a nut threaded over the end of the stud and clamping a shoulder of the stud against a side of the pitman 54.

The cam 50 is secured to one end of a drive shaft 60 supported by suitable bearings in the frame 11. At the other end of the shaft 60 there is a fly wheel pulley 62 driven by a belt 63 from an electric motor 64 (Figure 1) mounted on the base 10.

The conveyor disc is rotated intermittently by pawl and ratchet mechanism driven from the motor 64. Power is conveyed to this pawl and ratchet mechanism from a bevel gear 67 (Figure 3) secured to the upper end of a shaft 68 which turns in bearings in the frame 11. At the lower end of the shaft 68 there is a hub 70 secured to the shaft. There are two eccentrics 71 and 72 integrally connected with the hub 70.

An eccentric strap 75, which surrounds the upper eccentric 71, is connected with a link 76 by a pivot connection 77. This link 76 is of composite construction and has overlapping portions clamped together by plates 79 (Figure 4) and a clamping bolt 80 which extends through the plates 79. A pawl 82 is carried by the free end of the link 76 and there is a spring 83 urging the pawl 82 into engagement with ratchet teeth 85 on the peripheral edge of the indexing disc 18.

The pawl 82 is pivotally connected with the link 76 by an eccentric 87. Approximate adjustment of the length of the link 76 is obtained by loosening the clamping bolt 80 and moving the portions of the link 76 to increase or decrease the length of the link as desired. Final adjustment of the effective length of the link 76 is obtained by turning the eccentric 87 to move the pawl 82 lengthwise of the link.

The lower eccentric 72 operates an eccentric strap 90 which is connected with an indexing device 91 that includes a plunger 92. There are recesses 93 between the ratchet teeth 85 for engagement by the plunger 92. In the construction shown, both the plunger 92 and the recesses or sockets 93 have tapered surfaces for causing the indexing disc 18 to either advance or retreat, if necessary, as the plunger 92 moves into each successive recess 93 to obtain the angular position of the indexing disc 18 which corresponds to an exact alignment of corresponding button holding openings of the conveyor disc with the broaching heads.

In the adjustment of the device, the pawl 82 is positioned so that the end of its stroke is at a position which leaves one of the sockets 93 substantially in line with the plunger 92. There is a spring-pressed friction brake 95 (Figure 1) carried by the frame extension 12 in position to bear against the upper surface of the disc 18 to prevent coasting of the disc at the end of each stroke of the pawl.

Figure 5 shows the detailed construction of the broaching head 43. The construction of the other broaching head is identical. A tube 100 has an upper portion of reduced diameter that serves as an outer spindle 101 by which the broaching head is held in the punch head of the machine. A socket head 103 fits within the lower portion of the tube 100 and slides up and down in the tube with a telescoping movement.

There is an inner spindle 105 rigidly connected with the upper end of the socket head 103. This inner spindle 105 is of a diameter small enough to slide within the outer spindle 101. A spring 107 is compressed between the inner spindle 105 and the top of the outer spindle 101; and this spring 107 urges the inner spindle 105 and socket head 103 downward.

There is a slot 110 extending from one side of the spindle 105 completely through the spindle to the other side. This slot 110 is of substantially uniform width and is twisted about the axis of the spindle 105, preferably with a uniform pitch. A pin 112 extends transversely of the axes of the tube 100 and spindle 105, and extends through the slot 110. This pin 112 is held against endwise movement by a snap ring 114 placed in a groove in the outside surface of the tube 100. The pin 112 causes the spindle 105 and socket head 103 to rotate as they move axially in the tube 100. The length and pitch of the slot 110 are preferably sufficient to impart 180° of rotation to the socket head 103.

In the lower end of the socket head 103 there is a socket 116 for receiving a tool 118. This tool has a recess 120 in its side wall in position to be engaged by a set screw 121 screwed through one side of the socket head 103. The tool 118 is of cylindrical cross section and the socket 116 is of a diameter to fit the cross section of the tool 118 except at the upper end of the socket 116 where straight side walls 123 are provided for requiring the tool 118 to be always locked in the socket head in the same relative angular position with respect to the spindle 105 and the pin 112. The tool 118 has flat faces 125 (Figure 6) at its upper end in position to contact with the straight faces of the socket in which it is carried in the broaching tool.

There are a plurality of openings 128 in the body portions of the tool 118. These openings are substantially parallel and are of uniform diameter except for counterbores 130 at the upper end of the body portion.

Pins 132 in the openings 128 extend for a substantial distance beyond the lower ends of the openings 128 and comprise the portions of the tool which engage the holes in the buttons. There are as many pins 132 as there are holes in the buttons to be broached. Each of the pins has a head 133 which fits into the counterbore 130. The heads 133 are larger than the diameters of the openings 128 so as to prevent the pins from dropping out of the broaching head.

It is a feature of the invention that the pins 132 have a diameter which is at least approximately 0.006 inch less than the diameter of the openings 128. This substantial clearance provides sufficient side play to enable the pins 132 to accommodate themselves to buttons in which the holes are imperfect. In broaching machines of the prior art, where no substantial side play of the pins was provided, many imperfect buttons were broken, or pins broken, by the broaching operation.

Figure 7 shows an imperfect button in which the portions of the holes 135 made by the opposite mold halves are out of line. The construction illustrated in Figure 6, which provides substantial side clearance for the pins 132, permits the pins to shift slightly and accommodate themselves to misalignment such as shown in Figure 7, it being understood that the misalignment in Figure 7 is exaggerated for clearer illustration. If the pins 132 had no side play, the button in Figure 7 would either be broken, or would break the pins, when it was subjected to the broaching operation.

It is another feature of the invention that the pins 132 have a substantial amount of end play independently of one another. For example, the heads 133 are slightly shorter than the counterbores 130 in the construction shown in Figure 6. This permits each of the pins 132 to move upward until it strikes the top of the socket in which the tool 118 is held.

It will be evident that the end play can also be obtained by having recesses in the top of the socket above the counterbores 130. With such recesses, end play of the pins is obtained even though the pin heads 133 are just as long as the counterbores 130. Experience has shown that an end play at least approximately 0.006 inch gives greatly improved results in the operation of the broaching head. The end play permits the machine to be operated faster and still obtain reliable engagement of the pins 132 with the holes in the buttons as the tool 118 is pushed downward. With the end play, the pins 132 start turning on the surface of the button before they have exerted enough pressure against the button to involve any danger of rotating the button in the button receiving holes of the conveyor disc.

Although the apparatus shown in Figures 5 and 6 has been described as a broaching head, and although it is used for this purpose in the button machine illustrated, it will be understood that this particular structure can be used in other kinds of button machines for properly positioning the buttons so that their holes are properly aligned with respect to sewing needles or stapling apparatus.

Reviewing the operation of the machine with reference to Figs. 1 and 4, the broaching heads 43 and 44 move upward to their upper dead center positions and remain in such positions while a circular portion of the cam groove 51 moves past the cam follower that operates the broaching heads. During this period of dwell of the broaching heads, the pawl and ratchet mechanism of Figure 4 turns the conveyor disc through an angle equal to the angular spacing of the holes in which the buttons are carried. As the pawl begins to retreat, the indexing plunger 92 moves into a socket 93 in the indexing disc 18. The plunger prevents retrograde movement of the disc 18 such as might be caused by friction with the retreating pawl 82, and as the plunger advances further into the socket 93, it positions the disc 18 and the conveyor disc 16 in the correct angular position for the broaching of the two buttons at the broaching station.

While the discs 16 and 18 are thus located in position, the cam 50 causes the punch head to move downward and bring the pins of the broaching heads into contact with the buttons at the broaching station. The tools of the broaching heads rotate in contact with the buttons as the broaching heads continue to descend, and at some point in their rotation, the tools bring their pins into register with the holes in the buttons so that the spring pressure in the broaching heads can force the pins through the holes in the buttons and clear out any flash or other obstruction that has been left by the molding operation.

It is not necessary that the broaching heads remain stationary while the conveyor disc is moving the buttons. It is sufficient if the conveyor heads are high enough to withdraw the pins from the holes in the buttons before the conveyor disc 16 begins to move, and the conveyor disc must stop and be indexed before the broaching heads have moved downward far enough to bring the pins into the holes in the buttons.

The preferred embodiment of the invention has been illustrated and described, but changes and modifications can be made, and some features of the invention can be used alone or in different combinations, without departing from the invention as defined in the claims.

What is claimed is:

1. A button broaching machine comprising a conveyor disc having an inclined axis and two circular rows of holes for holding buttons, a stationary plate under the conveyor disc providing a support for buttons that are located in the holes of the disc, a frame supporting the disc and its underlying plate on a slope, a hopper having a lower portion that comprises a wall attached to the stationary plate and extending upward past the periphery of the disc along a substantial arc at the lowest part of the disc, said wall being spaced from the periphery of the disc by a distance less than the thickness of the buttons with which the machine is intended to be used, said hopper having an upper portion with a discharge outlet at its lower end below the top of the wall in position to hold a mass of loose buttons in contact with the mass of buttons in the lower portion of the hopper to maintain a pressure on the buttons in the lower portion of the hopper and thus cause buttons to move into the holes in the conveyor disc, a broaching station at which there are holes through the stationary plate of smaller diameter than the holes in the conveyor disc and in position to align with holes in the conveyor disc when the conveyor disc is stopped with one hole of each row at the broaching station, the stationary plate having a cut-out portion beyond the broaching station and substantially larger than the buttons so that the buttons drop out of the holes in the conveyor disc after passing the broaching station, a punch head above the broaching station, guides along which the punch head reciprocates toward and from the broaching station, two broaching heads carried by the punch head and movable back and forth with respect to the openings through the stationary plate, mechanism for reciprocating the punch head, pawl and ratchet mechanism for moving the conveyor disc intermittently, and common driving mechanism for causing the punch head and pawl to operate in timed relation with one another.

2. A machine for broaching buttons including, in combination, a holder for a mass of buttons, a conveyor that carries buttons from the holder to a broaching station, said conveyor having individual sockets for moving one button at a time to the broaching station, pawl and ratchet mechanism for rotating the conveyor with an intermittent movement, indexing means for positioning and holding the conveyor with selected sockets in register with the broaching station, said indexing means including a device having tapered surfaces that advance or retreat the conveyor to obtain exact registry and operating mechanism that moves the indexing device into position to hold the conveyor against retrograde movement as the pawl begins each of its return strokes after advancing the ratchet.

3. A button broaching machine comprising a rotary disc conveyor having a circular row of openings for receiving buttons, each opening being of substantially the same diameter as the buttons with which the conveyor is intended to be used, a supply hopper located over one portion of the conveyor for supplying buttons to the openings of the conveyor, a broaching station adjacent another portion of the conveyor, a broaching head at the broaching station, a button feeding apparatus including mechanism that turns the conveyor disc intermittently through angles substantially equal to the angular spacing of the openings in the disc to bring successive openings into substantial alignment with the broaching head, and an indexing device having a surface that turns with the disc and a plunger that engages successive sockets in said surface, the plunger having a surface that bears against the surface of the socket, one of the surfaces being tapered to cause the conveyor disc to advance or retreat as necessary to bring each successive button receiving opening into exact alignment with the broaching head.

4. A button broaching machine including a conveyor disc having holes at equal angular spacing around the center of the disc, a holder for buttons extending around a portion of the angular extent of the row of openings, a stationary plate under the conveyor disc and by which the buttons in the holes of the conveyor disc are supported, a broaching station to which each of the button receiving openings are brought successively by intermittent angular movement of the conveyor disc, a broaching head at the broaching station, a feeding apparatus for imparting to the conveyor disc successive angular movement substantially equal to the angular spacing of the holes in the conveyor disc, said feeding apparatus comprising pawl and ratchet mechanism, an indexing disc located below the stationary plate, a shaft connecting the indexing disc with the conveyor disc for rotation as a unit with the conveyor disc, said disc having ratchet teeth with angular spacing corresponding to the angular spacing of the button holes, which teeth comprise part of said ratchet mechanism, sockets in the peripheral surface of the indexing disc between the ratchet teeth, a plunger that engages said sockets to hold the indexing disc and the conveyor disc in position to align the respective openings of the conveyor disc successively with the broaching head, said plunger being tapered so as to cause the indexing disc and conveyor disc to advance or retreat as necessary to effect alignment as the plunger enters each socket, and means for adjusting the position of the pawl with respect to the indexing plunger when the pawl is at the end of its stroke.

5. In a button broaching machine, a tool holder comprising a tube, a socket head that moves up and down in said tube as a bearing, a spindle at the upper end of the socket head, a slot extending through the spindle from one side to the other, said slot being of substantially uniform width and being twisted about the axis of the spindle, a pin carried by the tube and extending through the slot for imparting angular movement to the spindle as the socket head moves up and down within the tube.

6. A broaching head comprising a tube, a socket head that slides within the tube with a telescoping movement, a spindle integrally connected with the socket head, a slot extending through the spindle from one side to the other, said slot being of substantially uniform width and being twisted about the axis of the spindle, an opening extending transversely through the tube at right angles to the axis of the socket head and spindle, a pin that fits within said opening and extends through the slot, said pin having a diameter that fits with running clearance in the slot, and said pin providing a bearing that imparts rotation to the spindle as the socket head and spindle move axially with respect to said tube, fastening means on the tube in position to prevent endwise movement of the pin, a spring urging the spindle and socket head axially in the tube, a tool holder in the lower end of the socket head, and a releasable fastening device retaining a tool in the tool holder.

7. A tool for engaging the holes in a button, said tool comprising a body portion with parallel openings therein, counterbores at the upper ends of said openings, a pin located in each of the openings and extending for a substantial distance beyond the lower end of the opening, a head at the upper end of each pin with a diameter greater than the diameter of the openings below the counterbores, each of the pins below the heads having a diameter that is at least approximately .006 inch smaller than the diameter of the openings in the body of the tool.

8. A tool for engaging the openings in a button, said tool comprising a body portion in which there are parallel openings of substantially equal and uniform diameter with counterbores at their upper ends, a pin extending through each of the openings and for a substantial distance beyond the lower end of the opening, a head at the upper end of each pin within the counterbore and of larger diameter than the opening below the counterbore, each of the pin heads being shorter than the counterbore by a distance sufficient to give the pin endwise movement in the body portion independently of the other pins.

9. In a button machine, a device for engaging the holes in successive buttons including, in combination, a head having a socket therein, a tool that fits within the socket, fastening means for retaining the tool within the socket, said tool including a body portion in which there are a plurality of substantially parallel openings with counterbores at their upper ends, a pin located in each of the openings and extending for a substantial distance beyond the lower end of the body portion, a head at the upper end of each pin located within the counterbore and of a diameter larger than the opening below the counterbore, each of said pins being of a substantially equal and uniform diameter that is at least approximately .006 inch less than the diameter of the openings below the counterbores, said device having a clearance between the upper ends of the heads of the pins and the end of the socket above the pins equal to at least approximately .006 inch to provide independent end play for the respective pins.

10. A button broaching machine including a sloping conveyor, hopper means for holding a mass of buttons, said hopper means including a lower portion surrounding the lower part of the sloping conveyor for holding a mass of buttons on the lower part of the conveyor, said hopper means including also an upper portion comprising a button container with a discharge outlet at its lower end extending into said lower portion and of less transverse cross-section than said lower portion but spaced for a substantial distance above that part of the conveyor immediately beneath said outlet, the conveyor having button-receiving recesses therein that pass under the buttons in the hopper and then upward to a broaching station, a broaching head at the broaching station, apparatus for producing relative movement of the broaching head and successive buttons to cause the broaching head to engage the openings in each successive button as the button reaches the broaching station, and driving mechanism for causing the engagement of the broaching head with the buttons to take place in timed relation with the movement of the conveyor.

11. A button broaching machine including a conveyor disc that rotates about a sloping axis and that has a circle of button recesses therein, means for supplying buttons to said recesses, said means comprising a lower hopper extending around a substantial arc of the lower part of the conveyor for holding a mass of loose buttons in position over the lower part of the conveyor and an upper hopper comprising a button container that extends for a substantial distance above the lower hopper and that has a bottom discharge outlet located at a substantial distance above the lower part of the conveyor in position to maintain a supply of additional loose buttons in contact with and as a continuation of the mass of buttons in the lower hopper for exerting pressure on the buttons in the lower hopper to facilitate their entry into the button-receiving recesses of the conveyor, a punch head having a broaching head in position to engage a button in the successive recesses at the upper part of the conveyor, apparatus for moving the punch head toward and from said upper part of the conveyor, and apparatus for moving the conveyor intermittently to bring successive recesses of the conveyor into position under the punch head and broaching head.

JOHN F. SCHNEIDER, Jr.

REFERENCES CITED

The following references are of record in the file of this patent:

UNITED STATES PATENTS

| Number | Name | Date |
| --- | --- | --- |
| 628,097 | Joslin | July 4, 1899 |
| 673,077 | Griffin | Apr. 30, 1901 |
| 1,082,632 | Hastings | Dec. 30, 1913 |
| 2,078,410 | Richards | Apr. 27, 1937 |
| 2,130,235 | Heyman | Sept. 13, 1938 |
| 2,254,479 | Foster et al. | Sept. 2, 1941 |
| 2,438,363 | Friedman | Mar. 23, 1948 |